United States Patent [19]

Kunert

[11] Patent Number: 4,933,032

[45] Date of Patent: Jun. 12, 1990

[54] PROCESS FOR PREPARING A READY-TO-ASSEMBLE MOTOR VEHICLE GLAZING

[75] Inventor: Heinz Kunert, Cologne, Fed. Rep. of Germany

[73] Assignee: Saint-Gobain Vitrage, Courbevoie, France

[21] Appl. No.: 360,654

[22] Filed: Jun. 2, 1989

[30] Foreign Application Priority Data

Jun. 3, 1988 [DE] Fed. Rep. of Germany ....... 3818930

[51] Int. Cl.$^5$ .............................................. B60J 1/00
[52] U.S. Cl. ..................................... 156/108; 52/208;
52/400; 52/746; 156/244.25; 156/293;
156/308.6; 296/84.1
[58] Field of Search ......................... 52/208, 400, 746;
156/108, 244.25, 293, 308.6, 310, 315; 296/84.1, 146

[56] References Cited

U.S. PATENT DOCUMENTS

| | | | |
|---|---|---|---|
| 3,416,833 | 12/1968 | Griffin | 52/208 X |
| 3,478,475 | 11/1969 | Strack | 52/208 |
| 4,571,278 | 2/1986 | Kunert | 156/108 |
| 4,581,276 | 4/1986 | Kunert et al. | 156/108 X |
| 4,635,420 | 1/1987 | Batky | 156/108 X |
| 4,704,175 | 11/1987 | Kunert et al. | 156/108 |

FOREIGN PATENT DOCUMENTS

121481 10/1984 European Pat. Off. .

Primary Examiner—Robert A. Dawson
Attorney, Agent, or Firm—Pennie & Edmonds

[57] ABSTRACT

Preparation of a ready-to-assemble glazing intended to be glued in the frame of a window opening of the vehicle body. According to the invention, two adhesive beads (18,15) are deposited, simultaneously or immediately after one another, on glass sheet (1), or on an opaque coating (10) in the shape of a frame adhering to sheet (1). The adhesive compound that forms the first bead (18) is selected or treated so that this bead sets in a relatively short time. The adhesive compound forming the second bead (15) is selected or treated so that this bead (15) remains plastically deformable and adhesive for a sufficient period to be used directly for gluing the glazing in the window opening during its assembly. Adhesive bead (18), which sets in a short time, optionally makes it possible to fasten parts of the structure frame, for example a tearing wire (21), and it advantageously comprises a shaped sealing lip (20).

25 Claims, 5 Drawing Sheets

PROCESS FOR PREPARING A READY-TO-ASSEMBLE MOTOR VEHICLE GLAZING

BACKGROUND OF THE INVENTION

This invention relates to a process for preparing a glazing, in particular a motor vehicle glazing, for its assembly in a frame of a window opening by gluing the marginal area of the glazing to a fastening flange of the window opening frame, in which at least two adhesive beads of calibrated cross section are deposited on the glazing each time by extrusion of an adhesive compound with a calibtated extrusion nozzle, one of the beads already having set when the glazing is placed in the window opening frame, while the other bead constitutes the active adhesive bead for fastening the glazing in said frame.

A process of this type is known according to the document EP-01214891 B1. In this known process, a first bead of adhesive is already applied to the glazing in the glass factory or at any time before assembly in the vehicle body. In the assembly line this eliminates the operations necessary for cleaning and preparing the glazings, which, at the assembly line, represents a notable simplification. Another significant advantage of this process resides in the fact that with this first adhesive bead, structure frame parts, such as, for example, moldings, shaped cover strips, bracing stripe or tearing wires can be fastened in advance permanently to the glazing. In this way, other operations, which otherwise would have to be preformed directly on the assembly line, can be performed in advance and at any time and, thereby, the operations on the assembly line are notably simplified.

In the case of the known process, the second adhesive bead is applied to the previously set bead or the the fastening flange of said frame in the motor vehicle assembly line, immediately before placing the glazing in the window opening frame.

SUMMARY OF THE INVENTION

The object of the invention is to develop this known process so that its advantages are kept in their entirety, but an additional simplification is achieved for the automaker on the assembly line.

The invention resides in the fact that both adhesive beads are deposited on the glazing during a single extrusion operation and a differentiated treatment of the two partial adhesive beads ensures that the first bead sets relatively quickly and preferably in as short a time as possible, while the second partial bead (namely, the bead that remains adhesive) remains plastically deformable and adhesive for a relatively long time and preferably for as long a period as possible.

As a result of the present invention, the operation of applying an adhesive bead in the assembly line is eliminated. On the contrary, this second operation is combined with the so-called precoating operation, i.e., the application of the first adhesive bead; but in accordance with the invention, the two adhesive beads that are applied simultaneously are treated differently so that, at the time of assembly of the glazing in the window opening frame, they have the desired different properties.

In a first embodiment, the different treatment of the two adhesive beads can be that they are made from different but compatible adhesive compounds which are advantageously coextruded with an extrusion head suitable for this purpose. During implementation of this embodiment of the process, the moment at which the two adhesives are applied to the glazing is determined by the use period (or setting time) of the adhesive compound forming the second assembly adhesive bead, provided that no other step is taken to prevent setting. The use period of the second adhesive cannot be too long, because after placing the glazing in the vehicle body, this glazing should be fastened in place as soon as possible. For this reason, it is advisable to apply the adhesive beads only relatively shortly before assembly of the glazing in the vehicle body; and it is desirable to be able to vary the setting times or use period of the two adhesive compounds from several hours to several days.

For example, for the bead that sets in a short time, polyurethane adhesives with one or more components are suitable; and a single-component polyurethane adhesive setting on contact with moisture can be used for the second bead, this bead being covered by a layer preventing premature setting, which is removed before assembly of the glazing.

According to another embodiment of the invention, for the second bead it is possible to use a multicomponent adhesive, in particular a multicomponent polyurethane adhesive, which contains an initiation or reaction component in microcapsules, in which case the setting reaction is started by destruction of the capsules by heating or exposure to microwaves immediately before assembly of the glazing. Such adhesive systems that can be activated are known in the prior art.

According to another embodiment of the invention, the same single-component polyurethanes, which set by contact with the moisture of the atmosphere are used both for the first bead that sets in a short time and for the second bead that remains adhesive. In this case, the second adhesive bead is covered with a layer preventing or retarding access of water vapor.

According to another embodiment of the invention, adhesive beads having different properties can also be obtained by extruding a combined assembly bead starting from a single adhesive compound which sets by input of outside energy. By using a localized input of mechanical or radiating energy to set selected lateral areas of the cross section of the combined assembly may be set beforehand, while the portion of the bead located between the set lateral areas of the cross section remains adhesive.

BRIEF DESCRIPTION OF DRAWINGS

These and other objects, features and advantages of the invention will be more readily apparent from the following detailed description of the invention in which.

DETAILED DESCRIPTION

Figure 1:
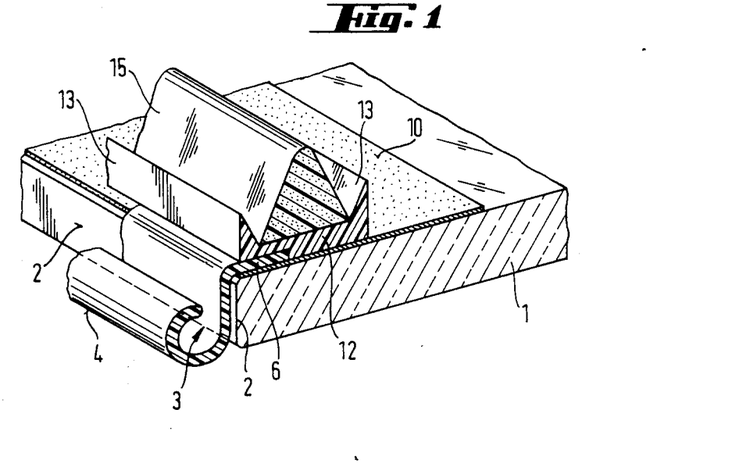
FIG. 1 illustrates a first embodiment of a motor vehicle glazing prepared for assembly.
Figure 2:
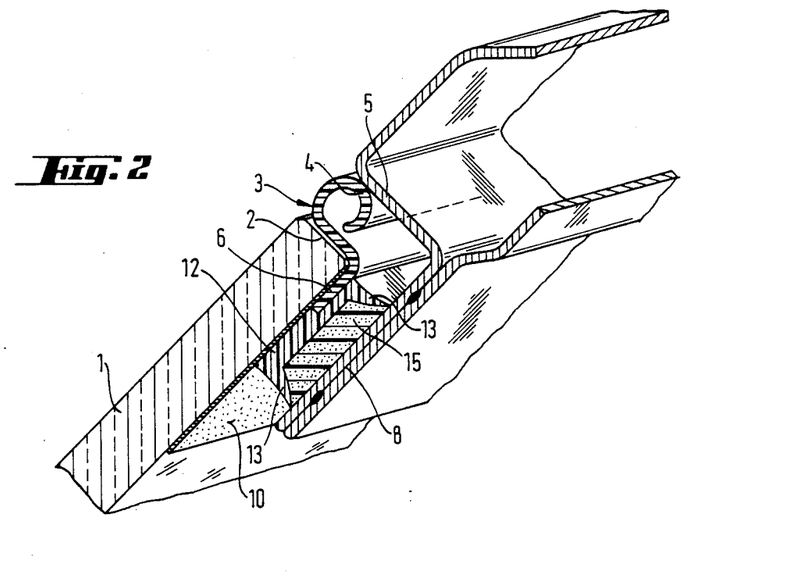
FIG. 2 illustrates the embodiment represented in FIG. 1 after its assembly in the vehicle body.

FIGS. 1 and 2 illustrate an embodiment of a motor vehicle glazing 1 preequiped and ready for assembly, in which glazing 1 is provided, along its peripheral edge 2, with a shaped flexible elastomer plastic strip 3. This shaped strip 3 exhibits an essentially hose-shaped section 4 which serves, in the mounted state of the glazing, to fill in the gap between edge 2 of the glazing and opposite flange 5 of a window opening frame. Bent section 6 of shaped strip 3 is glued to the face of glazing 1 turned toward fastening flange 8 of the window opening frame.

Glazing 1 is provided, around its marginal area, with an opaque covering 10 which, on the one hand, prevents any view from the outside of the glued area and, on the other hand, protects the adhesive layers from UV radiation, which otherwise would cause embrittlement of the adhesive. Coating 10 is usually made of a baking enamel which has been baked during the heating occurring in the bending and/or in the operations of tempering the glazing.

When a glued joint is made, a suitable preparation of the glass surface to which the adhesive compound must adhere is also a part of the usual operations. Generally, this preparation of the surface consists in a treatment with a suitable cleaning liquid followed by coating with an adequate bottom layer, but this preparation of the glazing depends each time on the adhesive system used.

Installation of shaped peripheral frame 3 on the glazing before assembly of the glazing in the window opening frame has the great advantage that assembly of the glazing on the assembly line is simplified. To achieve this end, gluing of strip or shaped frame 3 must be performed when this element exhibits, for example, the L-shaped cross section represented. (An L-shaped cross section is necessary when an aerodynamic assembly of the glazing must be made, i.e., when no part of the frame can project on the outside surface of the glazing). Gluing of shaped frame 3 to the glazing is performed with a shaped adhesive bead 12 which, further, performs the known functions mentioned above. Shaped adhesive bead 12 preferably exhibits an essentially U-shaped cross section having lateral ribs 13 that laterally delimit adhesive bead 15 when the glazing is put into the frame.

Channel-shaped adhesive bead 12 and adhesive bead 15, which is applied to adhesive bead 12, are deposited in the same operation on the glazing by coextrusion. In this case, an adhesive compound, which sets in a relatively short time and which assures a solid joint of shaped frame 3 to the glazing, is used for extrusion of adhesive bead 12. For adhesive bead 15, which performs the function of an assembly adhesive, an adhesive compound is used which, on the one hand, is compatible with adhesive bead 12, i.e., which suitably adheres to adhesive bead 12 and which, on the other hand, exhibits a notably longer use period (or setting time) and remains plastically deformable and adhesive for a predefined period.

Preparation of the glazing for assembly is advantageously performed at a work station ahead of the assembly line. In this way, the glazings can be prepared a predetermined length of time before the moment of assembly, for example, several hours to several days before their assembly and be supplied to the assembly line at the moment they are needed there.

When adhesive compounds exhibiting different use periods are used for shaped adhesive bead 12 and assembly adhesive bead 15, it is possible to use with particular advantage single-component or multicomponent polyurethane adhesives which have proved satisfactory as adhesives for assembly of motor vehicle glazings. In particular in the case of multicomponent polyurethane adhesives, it is known that the setting time can be adjusted in broad limits by various measures. Suitable adhesive compositions are described, for example, in the documents DE 3545 899 Cl, EP 0 153 456 A1 and 0 238 890 A 1. With known adhesives of this type, it is possible to make glazings prepared for assembly in which adhesive bead 12 is set, for example, after an hour, while the use period of assembly adhesive bead 15 is at least three hours.

A particularly advantageous embodiment of the process consists in using, for shaped adhesive bead 12, a single-component or multicomponent polyurethane adhesive, which sets in a relatively short time, and in providing, for adhesive bead 15, a multicomponent polyurethane adhesive containing an initiating or reaction component in unactivated form, for example in the form of microcapsules, activation of this initiating or reaction component being performed, for example, by heating or by suitable irradiation of adhesive bead 15 or of the prepared glazing unit, immediately before assembly of the glazing.

In the embodiment represented in FIGS. 3 and 4, glazing 1 is again provided, along its marginal area, with an opaque coating 10 and, for assembly in the window frame of the motor vehicle, it is preequipped with frame-shaped adhesive bead 18 and, at the same time, with an assembly adhesive bead 15. Shaped adhesive bead 18 exhibits, in this case, as such, a sealing lip 20 which projects from the periphery of the glazing and which has the function, in the assembled state of the glazing, to bridge or block the gap separating the surface of edge 2 and an opposite flange 5 of a window frame. Further, this sealing lip 20 has the function of acting as a centering lip during placement of the glazing in the rabbet of the window frame. It assures that peripheral surface 2 of the glazing is kept, on all sides, at the same distance from flange 5 of the window frame and it holds the glazing in this centered position during setting of the assembly adhesive. In this case, this sealing lip 20 is formed directly during extrusion of shaped bead 18 by a suitable configuration of the extrusion nozzle and consequently is a part of this shaped bead 18 itself. Further, shaped bead 18 again exhibits a channel-shaped cross section comprising two lateral ribs 13 which laterally delimit assembly adhesive compound 15.

Figures 3, 4:
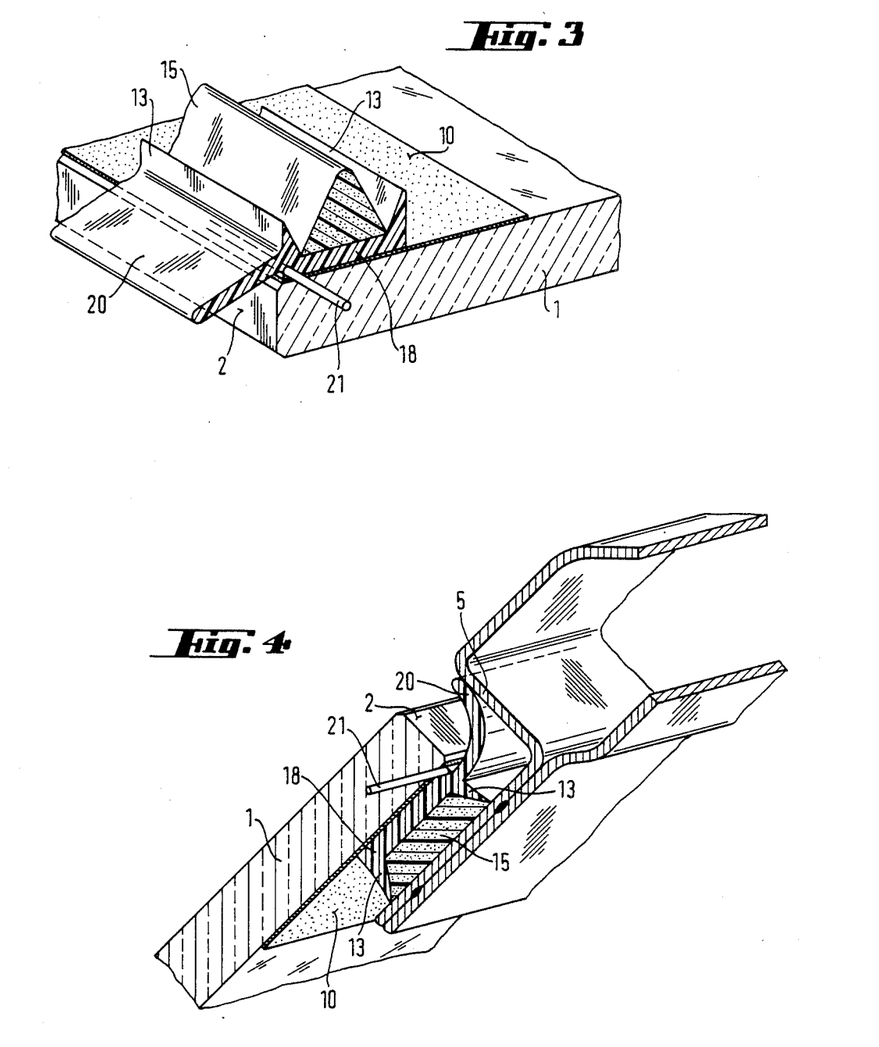
FIG. 3 illustrates a second embodiment of a motor vehicle glazing prepared for assembly.
FIG. 4 illustrates the embodiment represented in FIG. 3 after its assembly in the vehicle body.

Setting of shaped bead 18 should take place at the moment of assembly of the glazing. A fast setting of this shaped bead 18 is also necessary so that freely projecting sealing lip 20 does not deform. Further, the setting time should be as short as possible to assure fastening of a tearing wire 21 which is buried in this adhesive bead during extrusion of shaped bead 18. This tearing wire 21 has the task of facilitating removal of the glazing from the window frame, because it acts as a separation wire to cut the adhesive bead. Further details of this tearing wire are set forth in applicant's U.S. Pat application Ser. No. 07/242,764 which is incorporated herein by reference.

If necessary, sealing lip 20 can be made of a material different from that of the rest of shaped bead 18 and be made by coextrusion at the same time as shaped bead 18. In this way, it is possible to make sealing lips having modified properties, which, for example, exhibit an increased stability in regard to UV rays and/or an increased resistance to the weather because, contrary to the rest of shaped bead 18, the sealing lip is partly exposed directly to the weather.

Extrusion of assembly adhesive bead 15, which is deposited in the channel of shaped bead 18, occurs at the same time as extrusion of shaped bead 18. The adhesive compound forming shaped bead 18 again is different from adhesive compound forming the assembly adhesive bead 15 which, for its part, has a relatively long use period from several hours to several days. In this case, the respective adhesive compounds can be the same as those described in regard to FIG. 1 and 2.

Figure 5:
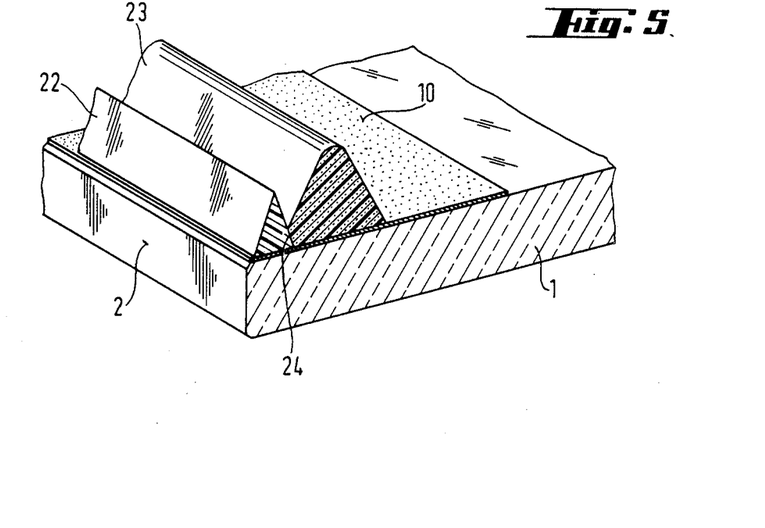
FIGS. 5 to 8 illustrate other embodiments of a motor vehicle glazing prepared for assembly.

FIG. 5 illustrates an embodiment in which two adhesive beads are deposited side by side on glazing 1, which again has been provided with a frame-shaped opaque coating 10. Adhesive bead 22 consists of an adhesive compound setting in a relatively short time. It exhibits an approximately triangular cross section. When the glazing is being placed, adhesive bead 22 is used to determine the spacing between the glazing and the fastening flange of the window opening frame and, further, to prevent adhesive bead 23, which is plastically deformable and remains adhesive, from infiltrating the gap between the surface of edge 2 and the opposite flange of the window opening frame. Further, adhesive bead 22 can be used, for example, to fasten a tearing wire or other parts of the structure frame. Partial bead 23 consists of the adhesive compound that remains adhesive. In this case, it is applied directly to the glazing or to coating 10 and is connected only laterally in the area of contact surface 24 to adhesive bead 22.

Figure 6:
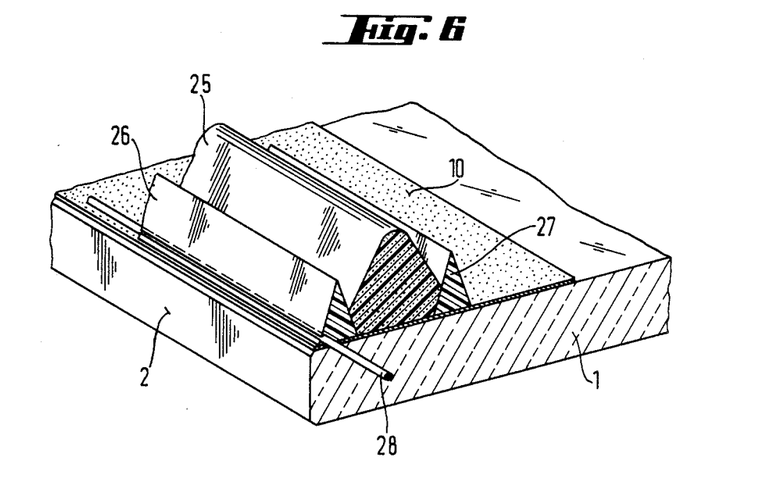

The embodiment represented in FIG. 6 is also characterized in that adhesive bead 25, which remains adhesive, is directly in contact with coating 10 or with the surface of the glass and is limited only laterally by two set adhesive beads 26 and 27. Set adhesive beads 26 and 27 again act as delimiting ribs for assembly adhesive bead 25, as well as spacing shims. Further, a tearing wire 28 is placed in set adhesive bead 26.

Figure 7:
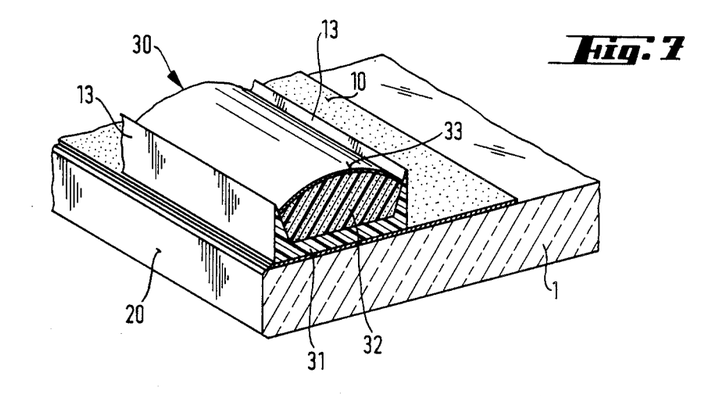

In the embodiment of the invention illustrated in FIG. 7, glazing 1 is provided with an opaque coating 10 on which an extruded composite section 30 is placed. This composite section 30 again consists of a U-shaped adhesive bead 31, made of an adhesive compound that sets rather quickly, as well as of an assembly adhesive bead 32 placed in the channel formed by adhesive bead 31 and consisting of a more slowly setting adhesive compound. In this case, assembly adhesive bead 32 consists of a single-component polyurethane which sets by reaction with the moisture of the ambient atmosphere. The free surface of adhesive bead 32 is covered with a film 3 which protects the surface of adhesive bead 32 from direct contact with the ambient atmosphere.

This prevents contact of the surface of adhesive bead 32 with the air moisture, and retards contact with this air moisture. The period between preparation of the glazing and assembly of this glazing can thus be notably prolonged.

Immediately before assembly of the glazing, film 33 is removed and thus the surface of assembly adhesive bead 32 is freed.

Film 33 is made, for example, from a polymer suited for casting or extrusion. It is applied, at the same time or immediately after coextrusion of the two adhesive beads 31 and 32, on adhesive bead 32 in a coherent layer that goes from one lateral rib 13 to the other lateral rib 13. The material of which film 33 consists and its thickness should be selected so that film 33 can be pulled off in a single piece from adhesive bead 32 and so the adhesive properties of adhesive bead 32 are not adversely affected.

Film 33 can also be made, for example, from an inorganic material able to be applied in the pourable state, which sets or crystallizes into a closed filmlike coating and which does not require any additional operation to remove the film during assembly of the glazing, but by itself frees the assembly adhesive layer. When this layer is made, for example, from a fragile inorganic material, which is subjected to internal stress, the film is pulled off under the effect of pressure stresses exerted during assembly of the glazing and is divided into small fragments, so that the surface of the assembly adhesive bead is freed. For their part, the fragments are wetted by the adhesive compound and buried in it and do not impede the gluing operation. If necessary, suitable measures, such as an irradiation or similar measures, make it possible to assure that the necessary embrittlement of the film occurs only shortly before assembly of the glazing.

Figure 8:
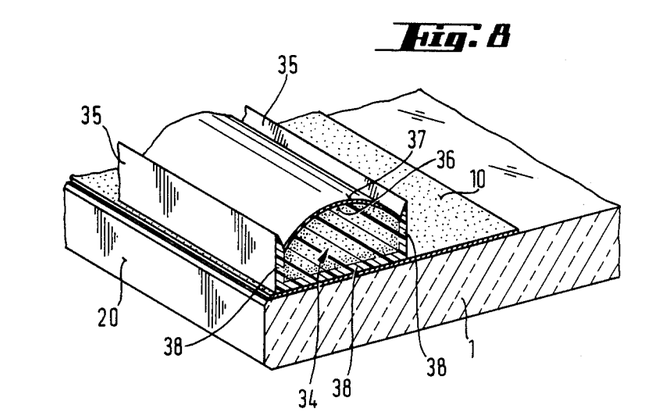

A particularly economical embodiment of the process to the invention is illustrated in FIG. 8. In this case, coextrusion of two different adhesive compounds to form a composite section is not performed as described above but there is extruded and deposited on glazing 1, or on coating 10 applied to glazing 1, a shaped adhesive bead 34, which is homogeneous and is made from a single-component polyurethane setting on contact with atmospheric moisture. The cross section of adhesive bead 34 corresponds approximately to the cross section of a composite section formed from a base section with a U-shaped cross section deposited on the glazing and from an assembly adhesive bead placed in the base section, the upper side of adhesive bead 34 being shaped so that two lateral longitudinal lips 35 are formed between which adhesive compound forms a bulge 36.

The surface of bulge 36 of adhesive bead 34 is again covered with a film 37. Film 37 consists of one of the materials with very slight permeability to water vapor described in the preceding example. It protects the covered surface from access to water vapor. In this way, the area between longitudinal lips 35 below film 37 remains plastically deformable and adhesive. On the other hand, the ambient moisture freely has access to the unprotected surfaces of adhesive bead 34. It assures that adhesive bead 34 sets in a marginal area 38 with a U-shaped cross section, while in the area covered by film 37 it remains plastically deformable and adhesive.

Alternatively, a single homogenous bead could be used that can be set by selective application of external energy. In this case localized application of mechanical or radiant energy is used to set the lateral lips 35 while the portion of the head between these lips remains adhesive. After the glazing is installed in the window frame the adhesive portion is then set by application of external energy.

Figure 9:
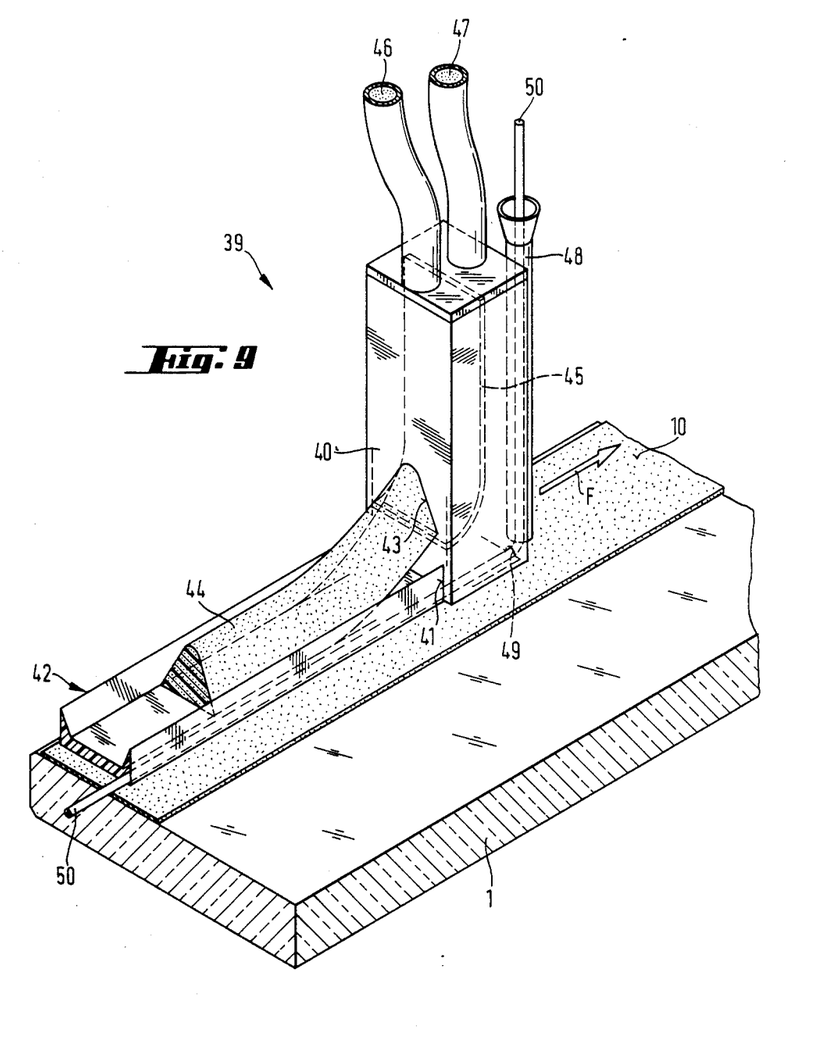
FIG. 9 illustrates an extrusion head intended for extruding and depositing two shaped adhesive beads simultaneously.

Finally, FIG. 9 shows an extrusion head suitable, for example, for coextrusion of two different adhesive compounds and for their deposit on glazing 1 or on coating 10 placed in the marginal area of the glazing. Extrusion nozzle 39 itself consists of a square pipe 40 open at its lower end, in contact with the glazing, and which is moved in the direction of arrow F on glazing 1. Square pipe 40 exhibits, on the back side viewed in the direction of movement, a lower nozzle orifice 41 whose shape corresponds to the desired cross section of shaped bead 42. A second nozzle orifice 43 is provided above nozzle orifice 41. The shape of this nozzle orifice 43 corresponds to the desired cross section of adhesive bead 44 which is used as the assembly adhesive bead. Square pipe 40 is divided inside by a partition 45 into two spaces separated from one another, one of which is in communication with nozzle orifice 43 and is fed by feed pipe 46 with the adhesive compound intended for assembly adhesive bead 44, while the other is in communication with nozzle orifice 41 and is fed by feed pipe 47 with the adhesive compound which forms shaped bead 42.

Further, a coaxial guide pipe 48 is provided on square pipe 40 at the front of the latter and is used to bring, to an opening 49 provided at the bottom of the rear wall of the square pipe, a cable 50 of a very resistant fibrous material. This cable 50 is thus buried in shaped bead 42 and serves as the tearing cable.

When the embodiments of FIGS. 7, 8 are to be achieved, extrusion nozzle 39 is further provided with another nozzle orifice and a corresponding feed device which make it possible to apply the covering film to the assembly adhesive bead.

I claim:

1. A process for preparing a glazing, in particular a motor vehicle glazing, for assembly in a window opening frame by gluing the marginal area of the glazing to a fastening flange of the window opening frame, in which at least two adhesive beads are placed on the glazing by extrusion of an adhesive compound from an extrusion nozzle, a first bead already being set when the glazing is put into place in the window opening frame and a second bead forming an active assembly bead for fastening the glazing in the window opening frame, characterized in that the adhesive beads are placed on the glazing during a single extrusion operation and a differentiated treatment of the two adhesive beads ensures that the first bead sets in a short time before assembly of the glazing in the window opening while the second bead remains plastically deformable and adhesive until the glazing is placed in the window opening.

2. The process according to claim 1 wherein the adhesive beads are coextruded with a suitable single extrusion head.

3. The process according to claim 1 wherein the adhesive beads are formed from different but compatible adhesive compounds.

4. The process according to claim 3 wherein a single-component or multicomponent polyurethane adhesive is used for the first bead.

5. The process according to claim 4 wherein a single-component polyurethane adhesive that sets with moisture is used for the second bead and this bead is covered with a layer that prevents any premature setting, which layer is removed before the glazing is put in place.

6. The process according to claim 3 wherein the adhesive compounds are made of polyurethanes with two or more components having use periods that are differently regulated by modification of the proportions of the mixture of individual components.

7. The process according to claim 3 wherein the second bead is a multicomponent polyurethane adhesive which contains an initiating or reaction component in microcapsules and a setting reaction is started by destruction of the capsules by heating or exposure to microwaves immediately before assembly of the glazing.

8. The process according to claim 1 wherein the first and second beads are formed from single-component polyurethanes which set by contact with the moisture of the atmosphere and the second adhesive bead is covered with a layer preventing or retarding access of water vapor.

9. The process according to claim 8 wherein the first and second beads are made of the same single-component polyurethane.

10. The process according to claim 1 wherein the second bead is placed on the first bead.

11. The process according of claim 1 wherein one or more beads that set in a short time are placed on the glazing in the shape of lateral delimitation ribs and/or spacing shims relative to the fastening flange and a second bead that forms an active assembly bead is placed beside the bead that sets in a short time or between two beads that set in a short time.

12. The process according to claim 1 wherein during the extrusion of the first bead there is placed in this partial bead a flexible cable serving, if necessary, as a tearing wire to cut the glued joint.

13. The process according to claim 1 wherein the second bead is covered by a layer of fragile material preventing a premature setting, which, under the effect of pressure stresses exerted during assembly of the glazing, breaks into small fragments and, if necessary, is detached from said adhesive bead.

14. The process according to claim 1 wherein the first bead comprises a sealing lip which is integral with it.

15. The process according to claim 1 wherein sealing lips are extruded at the same time as the first bead, said sealing lips projecting beyond a periphery of the glazing and made of an extrudable plastic material with increased resistance to UV and/or hydrolysis.

16. The process according to claim 1 wherein during extrusion of the first bead shaped prefabricated laths are fastened to the glazing with the help of the extruded adhesive compound.

17. A process for preparing a glazing, in particular a motor vehicle glazing, for assembly in a window opening frame by gluing the marginal area of the glazing to a fastening flange of the window opening frame, in which a shaped bead is extruded on the glazing and is selectively set along lateral areas of the cross section of the adhesive bead before assembly of the glazing in the window opening frame, while the median part of the adhesive bead remains plastically deformable and adhesive until the glazing is placed in the window opening.

18. The process according to claim 17 wherein the shaped bead is formed from single component polyurethane.

19. The process according to claim 17 wherein sides of the bead are set by contact with the atmosphere and the median part of the adhesive bead, located between said sides, is covered with a film which protects it from direct exposure to water vapor.

20. The process according to claim 17 wherein sides of the bead are set by a localized input of external mechanial or radiating energy while the median part of the bead, located between the sides remains adhesive.

21. The process according to claim 17 wherein during the extrusion of the bead there is placed in this bead a flexible cable serving, if necessary, as a tearing wire to cut the glued joint.

22. The process according to claim 17 wherein the median part of the adhesive bead is covered by a layer of fragile material preventing premature setting, which, under the effect of pressure stresses exerted during assembly of the glazing, breaks into small fragments and, if necessary, is detached from said adhesive bead.

23. The process according to claim 17 wherein the shaped bead comprises a sealing lip which is integral with it.

24. The process according to claim 17 wherein sealing lips are extruded at the same time as the adhesive bead, said sealing lips projecting beyond a periphery of the glazing and made of an extrudable plastic material with increased resistance to UV and/or hydrolysis.

25. The process according to claim 17 wherein during extrusion of the bead shaped prefabricated laths are fastened to the glazing with the help of the extruded adhesive compound.

* * * * *